United States Patent
Pawlowski et al.

(10) Patent No.: US 11,586,514 B2
(45) Date of Patent: Feb. 21, 2023

(54) HIGH RELIABILITY FAULT TOLERANT COMPUTER ARCHITECTURE

(71) Applicant: STRATUS TECHNOLOGIES IRELAND LTD., Dublin (IE)

(72) Inventors: Chester W. Pawlowski, Maynard, MA (US); John M. Chaves, Hudson, MA (US); Andrew Alden, Leominster, MA (US); Craig D. Keefer, Nashua, NH (US); Christopher D. Cotton, Nashua, NH (US); Michael Egan, Groton, MA (US)

(73) Assignee: STRATUS TECHNOLOGIES IRELAND LTD.

( * ) Notice: Subject to any disclaimer, the term of this patent is extended or adjusted under 35 U.S.C. 154(b) by 583 days.

(21) Appl. No.: 16/536,745

(22) Filed: Aug. 9, 2019

(65) Prior Publication Data

US 2020/0050523 A1    Feb. 13, 2020

Related U.S. Application Data

(60) Provisional application No. 62/717,939, filed on Aug. 13, 2018.

(51) Int. Cl.
*G06F 11/20* (2006.01)
*G06F 13/28* (2006.01)
(Continued)

(52) U.S. Cl.
CPC ........ *G06F 11/2028* (2013.01); *G06F 11/203* (2013.01); *G06F 11/2007* (2013.01);
(Continued)

(58) Field of Classification Search
CPC .... G06F 11/3664; G06F 9/44; G06F 11/3684; G06F 11/3688
See application file for complete search history.

(56) References Cited

U.S. PATENT DOCUMENTS 4,608,688 A   8/1986   Hansen et al.
6,355,991 B1  3/2002   Goff et al.
(Continued)

OTHER PUBLICATIONS

Kabemoto A et al: "The architecture of the Sure System 2000 communications processor", IEEE Micro, IEEE Service Center, Los Alamitos, CA, US, vol. 11, No. 4, Aug. 1, 1991 (Aug. 1, 1991), pp. 28-31, XP011417505, ISSN: 0272-1732, DOI: 10.1109/40.85724 (Year: 1991).*
(Continued)

*Primary Examiner* — Bryce P Bonzo
*Assistant Examiner* — Michael Xu
(74) *Attorney, Agent, or Firm* — K&L Gates LLP

(57) ABSTRACT

A fault tolerant computer system and method are disclosed. The system may include a plurality of CPU nodes, each including: a processor and a memory; at least two IO domains, wherein at least one of the IO domains is designated an active IO domain performing communication functions for the active CPU nodes; and a switching fabric connecting each CPU node to each IO domain. One CPU node is designated a standby CPU node and the remainder are designated as active CPU nodes. If a failure, a beginning of a failure, or a predicted failure occurs in an active node, the state and memory of the active CPU node are transferred to the standby CPU node which becomes the new active CPU node. If a failure occurs in an active IO domain, the communication functions performed by the failing active IO domain are transferred to the other IO domain.

20 Claims, 7 Drawing Sheets

(51) Int. Cl.
*G06F 13/40* (2006.01)
*G06F 13/42* (2006.01)

(52) U.S. Cl.
CPC .......... *G06F 13/28* (2013.01); *G06F 13/4022* (2013.01); *G06F 13/4282* (2013.01); *G06F 2201/82* (2013.01); *G06F 2213/0026* (2013.01)

(56) References Cited

U.S. PATENT DOCUMENTS

| | | |
|---|---|---|
| 6,633,996 B1 | 10/2003 | Suffin et al. |
| 6,687,851 B1 | 2/2004 | Somers et al. |
| 6,691,225 B1 | 2/2004 | Suffin |
| 6,691,257 B1 | 2/2004 | Suffin |
| 6,708,283 B1 | 3/2004 | Nevin et al. |
| 6,718,474 B1 | 4/2004 | Somers et al. |
| 6,766,413 B2 | 7/2004 | Newman |
| 6,766,479 B2 | 7/2004 | Edwards |
| 6,802,022 B1 | 10/2004 | Olson |
| 6,813,721 B1 | 11/2004 | Tetreault et al. |
| 6,842,823 B1 | 1/2005 | Olson |
| 6,862,689 B2 | 3/2005 | Bergsten et al. |
| 6,874,102 B2 | 3/2005 | Doody et al. |
| 6,886,171 B2 | 4/2005 | MacLeod |
| 6,928,583 B2 | 8/2005 | Griffin et al. |
| 6,970,892 B2 | 11/2005 | Green et al. |
| 6,971,043 B2 | 11/2005 | McLoughlin et al. |
| 6,996,750 B2 | 2/2006 | Tetreault |
| 7,065,672 B2 | 6/2006 | Long et al. |
| 7,496,786 B2 | 2/2009 | Graham et al. |
| 7,496,787 B2 | 2/2009 | Edwards et al. |
| 7,669,073 B2 | 2/2010 | Graham et al. |
| 7,904,906 B2 | 3/2011 | Puthukattukaran et al. |
| 7,958,076 B2 | 6/2011 | Bergsten et al. |
| 8,117,495 B2 | 2/2012 | Graham |
| 8,161,311 B2 | 4/2012 | Wiebe |
| 8,234,521 B2 | 7/2012 | Graham et al. |
| 8,271,416 B2 | 9/2012 | Al-Biek et al. |
| 8,312,318 B2 | 11/2012 | Graham et al. |
| 8,381,012 B2 | 2/2013 | Wiebe |
| 8,589,723 B2 * | 11/2013 | Kumar .................. G06F 13/385 714/6.3 |
| 8,812,907 B1 | 8/2014 | Bissett et al. |
| 9,251,002 B2 | 2/2016 | Manchek et al. |
| 9,588,844 B2 | 3/2017 | Bissett et al. |
| 9,652,338 B2 | 5/2017 | Bissett et al. |
| 9,760,442 B2 | 9/2017 | Bissett et al. |
| 10,216,598 B2 | 2/2019 | Haid et al. |
| 10,360,117 B2 | 7/2019 | Haid et al. |
| 2001/0042202 A1 | 11/2001 | Horrath et al. |
| 2002/0016935 A1 | 2/2002 | Bergsten et al. |
| 2002/0070717 A1 | 6/2002 | Pellegrino |
| 2003/0046670 A1 | 3/2003 | Marlow |
| 2003/0095366 A1 | 5/2003 | Pellegrino |
| 2004/0230861 A1 * | 11/2004 | Bailey .................. G06F 11/0745 714/E11.023 |
| 2006/0117300 A1 * | 6/2006 | Puthukattukaran .......................... G06F 11/1658 717/124 |
| 2006/0222125 A1 | 10/2006 | Edwards et al. |
| 2006/0222126 A1 | 10/2006 | Edwards et al. |
| 2006/0259815 A1 | 11/2006 | Graham et al. |
| 2006/0274508 A1 | 12/2006 | LaRiviere et al. |
| 2007/0011499 A1 | 1/2007 | Begsten et al. |
| 2007/0028144 A1 | 2/2007 | Graham et al. |
| 2007/0038891 A1 | 2/2007 | Graham |
| 2007/0106873 A1 | 5/2007 | Lally et al. |
| 2007/0174484 A1 | 7/2007 | Lussier et al. |
| 2009/0249129 A1 | 10/2009 | Femia |
| 2012/0159245 A1 * | 6/2012 | Brownlow .......... G06F 11/0793 714/E11.137 |
| 2015/0205688 A1 * | 7/2015 | Haid ................... G06F 11/2097 709/212 |
| 2015/0263983 A1 | 9/2015 | Brennan et al. |
| 2015/0370661 A1 * | 12/2015 | Swanson ............. G06F 13/4027 714/4.11 |
| 2016/0077937 A1 * | 3/2016 | Inforzato ............ G06F 11/2028 714/4.11 |
| 2016/0098372 A1 * | 4/2016 | Boyle ................. G06F 13/4282 710/313 |
| 2017/0324609 A1 | 11/2017 | Hong et al. |
| 2018/0046480 A1 | 2/2018 | Dong et al. |
| 2018/0143885 A1 | 5/2018 | Dong et al. |
| 2019/0050302 A1 * | 2/2019 | Juniwal ................. G06F 3/0689 |
| 2020/0050523 A1 | 2/2020 | Pawlowski et al. |
| 2021/0034447 A1 | 2/2021 | Horvath et al. |
| 2021/0034464 A1 | 2/2021 | Dailey et al. |
| 2021/0034465 A1 | 2/2021 | Haid et al. |
| 2021/0034483 A1 | 2/2021 | Haid |
| 2021/0034523 A1 | 2/2021 | Dailey |
| 2021/0037092 A1 | 2/2021 | Cao |

OTHER PUBLICATIONS

Kabemoto et al., "The architecture of the Sure System 2000 communications processor", IEEE Micro, IEEE Service Center, Los Alamitos, CA, US, 11:4, 28-31, Aug. 1, 1991, (10 pages).
International Search Report and Written Opinion of International application No. PCT/US2019/045907, mailed from the International Searching Authority dated Feb. 12, 2020 (20 pages).
Dong et al., "COLO: COarse-grain LOck-stepping Virtual Machine for Non-stop Service", SoCC'13, Oct. 1-3, 2013, Santa Clara, California, USA, ACM 978-1-4503-2428-1; 16 pages.
Dong et al., "COLO: COarse-grain LOck-stepping Virtual Machine for Non-stop Service", https://www.linux-kvm.org/images/1/1d/Kvm-forum-2013-COLO.pdf; 24 pages.

* cited by examiner

HIGH RELIABILITY FAULT TOLERANT COMPUTER ARCHITECTURE

CLAIM OF PRIORITY

This application claims priority to U.S. Provisional Application Ser. No. 62/717,939 filed Aug. 13, 2018, the entirety of which is herein incorporated by reference.

FIELD

The disclosure relates generally to an architecture for a high reliability fault tolerant computer system and more specifically to a fault tolerant computer system with modular redundant components interconnected by a switching fabric.

BACKGROUND

High reliability fault tolerant computer systems are computer systems which have at least "five nines" reliability. This means that the computer is functioning at least 99.999% of the time and has an unplanned down time of at most about only five minutes per year of continuous operation.

To accomplish this high reliability, such fault tolerant computer systems frequently have redundant components such that when one component fails, begins to fail, or is predicted to fail, the programs using the failing computer component instead use a similar but redundant component of the system. There are generally two methods by which this failover is performed.

One method is to have two or more processor systems each executing the same application at the same time and periodically comparing their results to make sure that they are arriving at the same result. In such systems, when one system fails the other can continue to operate as a simplex or uniprocessor system until the failing system is replaced. When the failing system is replaced, the state of the non-failing system is copied to the replacement processor system and both systems then continue executing the same application as a duplex system.

A second method is to have two processor systems, one that is an active processor system that is executing the application, and another that is a standby processor system. In this configuration, the standby processor system periodically receives updates from the active processor system with the active processor system's state and memory contents. These points in time are called checkpoints and the transferred data is termed checkpoint data. When the active processor fails, begins to fail, or is predicted to fail, the active processor transfers its final state and memory contents to the standby processor system and the standby processor system becomes the new active processor system, continuing the calculations from the point at which the previously active processor system transferred its final state.

Both of these methods have shortcomings. In the first method, the cost of maintaining and running two duplicate computer systems continuously is not insignificant. In the second method, the time required to periodically supply the standby system with checkpointed state and memory data slows down the processing of the application by the active computer system.

The present disclosure addresses these shortcomings and others.

SUMMARY

In one aspect, the disclosure relates to a fault tolerant computer system. In one embodiment, the system includes a plurality of CPU nodes, wherein each CPU node includes a processor and a memory, and wherein one of the CPU nodes is designated a standby CPU node and the remainder are designated as active CPU nodes; at least two IO domains, wherein at least one of the IO domains is designated an active IO domain performing communication functions for the active CPU nodes; and a switching fabric connecting each CPU node to each IO domain. In another embodiment, if one of: a failure, a beginning of a failure and a predicted failure occurs in an active node, the state and memory of the active CPU node is transferred through the switching fabric to the standby CPU node and the standby CPU node becomes the new active CPU node, taking over for the previously failing node. In yet another embodiment, if one of: a failure, a beginning of a failure and a predicted failure occurs in an active IO domain, termed the failing active IO domain, the communication functions performed by the failing active IO domain are transferred to the other IO domain.

In still another embodiment, each CPU node further includes a communication interface in communication with the switching fabric. In still yet another embodiment, each IO domain includes at least two switching fabric control components, each switching fabric control component in communication with the switching fabric. In one embodiment, each IO domain further comprises a management processor. In yet another embodiment, the management processor of an active IO domain controls communication through the switching fabric. In still another embodiment, each IO domain is in communication with the other IO domain through a serial link. In one embodiment, the switching fabric is a Non-Transparent Bridge (NTB) PCI Express (PCIe) switching fabric.

In one embodiment, each IO domain further includes a set of IO devices, wherein each IO device includes one or more physical functions and/or virtual functions, wherein one or more physical and/or virtual functions in one IO domain are shareable. In one embodiment, one or more physical functions include one or more virtual functions. In one embodiment, the set of IO devices and the one or more physical and/or virtual functions are allocated to one or more CPU nodes and one or more of two switching fabric control components to define one or more sub-hierarchies assignable to ports of the one or more CPU nodes. In one embodiment, one or more of the set of IO devices and the virtual functions are partitioned among a set of physical CPU nodes, the set of physical CPU nodes comprising the active CPU node and the standby CPU node. In one embodiment, the system further includes one or more management engine instances which run on the management processor in each IO domain, wherein each management engine queries the switching fabric control components connected to the respective management engine to obtain an enumerated hierarchy of physical and/or virtual functions on a per control component basis, wherein each management engine merges the enumerated per-component hierarchies into a per-domain hierarchy of physical and/or virtual functions within the IO domain associated with each management engine.

In one embodiment, the system further includes one or more provisioning service instances, wherein each provisioning service runs on the management processor in each IO domain, wherein each provisioning service queries the per-domain management engine instance for the per-domain hierarchy, wherein each provisioning service per-domain instances communicates with the provisioning service in the other I/O domain to form a unified hierarchy of physical and/or virtual functions in the system. In one embodiment, either of the provisioning service per domain instances is capable of servicing requests from composition interfaces, wherein either of the provisioning service is also capable of verifying the viability of the system composition requests in terms of guaranteeing redundancy across IO domains. In one embodiment, either of the provisioning service per-domain instances is capable of servicing requests from industry standard system composition interfaces, wherein either of the provisioning service per-domain instances is also capable of verifying the viability of the system composition requests in terms of guaranteeing redundancy across IO domains.

In another aspect, the disclosure relates to a method of performing CPU node failover in a fault tolerant computer system. In one embodiment, the fault tolerant computer system includes a plurality of CPU nodes, each CPU node including a processor and a memory, wherein one of the CPU nodes is designated as a standby CPU node and the remainder are designated as active CPU nodes, at least two IO domains wherein at least one of the IO domains is designated an active IO domain performing communication functions for the active CPU nodes, and a switching fabric connecting each CPU node to each IO domain. In another embodiment, the method includes the steps of establishing a DMA datapath between the memory of an active but failing CPU node and the memory of the standby CPU node. In still another embodiment, the method includes transferring memory contents from the memory of the active but failing CPU node and the memory of the standby CPU node. In still yet another embodiment, the method includes tracking, by the active but failing CPU node, addresses in the active but failing CPU node to which DMA access occurs. In another embodiment, the method includes halting access to memory on the active but failing CPU node and copying any memory data which has been accessed since DMA was begun. In still another embodiment, the method includes copying the state of the processor in the active but failing CPU node to the standby CPU node. In yet still another embodiment, the method includes swapping all resource mapping from the active but failing CPU node to the standby CPU node; and allowing the previously designated standby CPU node to be the new active CPU node.

In another embodiment, the method includes the step of setting, by the active but failing CPU node, flags in its own NTB window into a PCI-Memory Mapped IO space and an NTB window of the standby CPU node so that each CPU node has its own intended new state after the failover operation. In still another embodiment, the method includes the step of the active but failing CPU node polling the standby CPU node for the status of start-up routines.

In another aspect, the disclosure includes a method of performing IO domain failover. In one embodiment, the method includes the step of enabling a failure trigger for each switching fabric control component in each IO domain, wherein the failure trigger includes but is not limited to link-down errors, uncorrectable and fatal errors, and software triggers; and upon a failure trigger occurring, stopping the drivers from using the failing IO domain.

Although, the disclosure relates to different aspects and embodiments, it is understood that the different aspects and embodiments disclosed herein can be integrated, combined, or used together as a combination system, or in part, as separate components, devices, and systems, as appropriate. Thus, each embodiment disclosed herein can be incorporated in each of the aspects to varying degrees as appropriate for a given implementation.

BRIEF DESCRIPTION OF THE DRAWINGS

The structure and function of the disclosure can be best understood from the description herein in conjunction with the accompanying figures. The figures are not necessarily to scale, emphasis instead generally being placed upon illustrative principles. The figures are to be considered illustrative in all aspects and are not intended to limit the invention, the scope of which is defined only by the claims.

DESCRIPTION OF A PREFERRED EMBODIMENT

Figure 1:
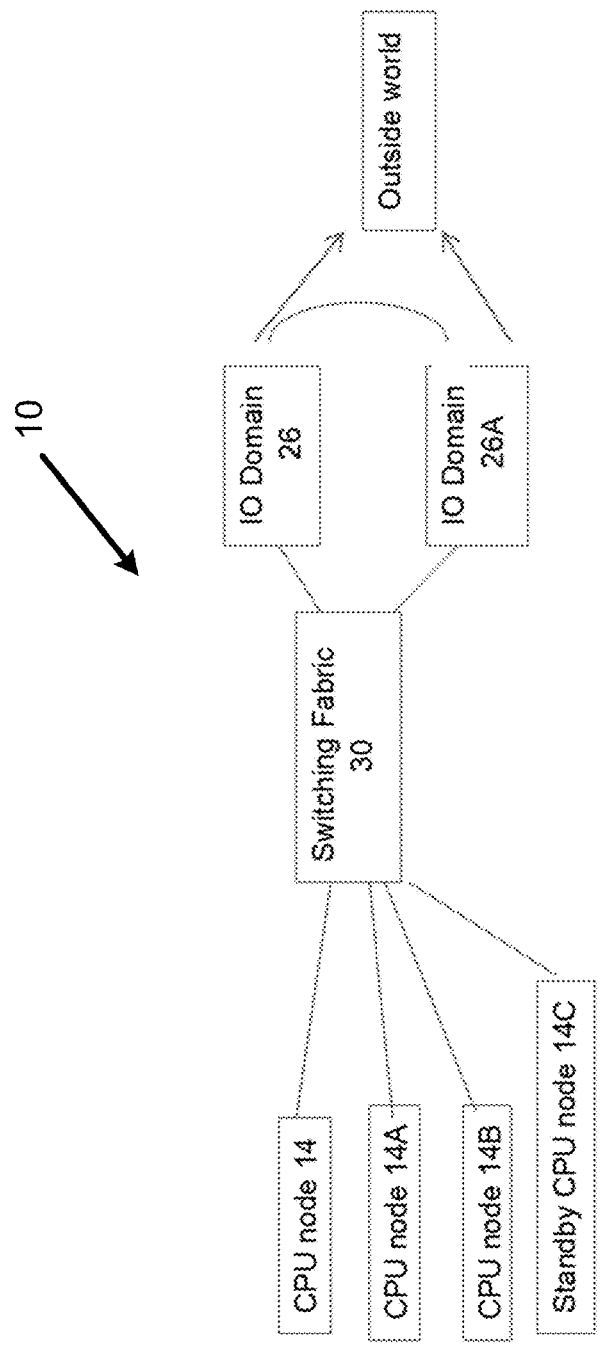
FIG. 1 is a block diagram of the high reliability fault tolerant computer system constructed in accordance with the disclosure.

In brief overview, a high reliability fault tolerant computer 10 constructed in accordance with the disclosure includes, in one embodiment, a plurality of CPU nodes (generally 14) interconnected to at least two IO domains (generally 26) through a mesh fabric network 30 as shown in FIG. 1. At least one of the nodes 14C of the plurality of nodes 14 is a standby node and does not execute applications unless one of the other CPU nodes 14, 14A, 14B either begins to fail or actually does fail. When a failure occurs, standby CPU node 14C acquires the state of the failing CPU node (for example, CPU node 14) and continues to execute the applications that were executing on the failing CPC node 14.

Figure 2:
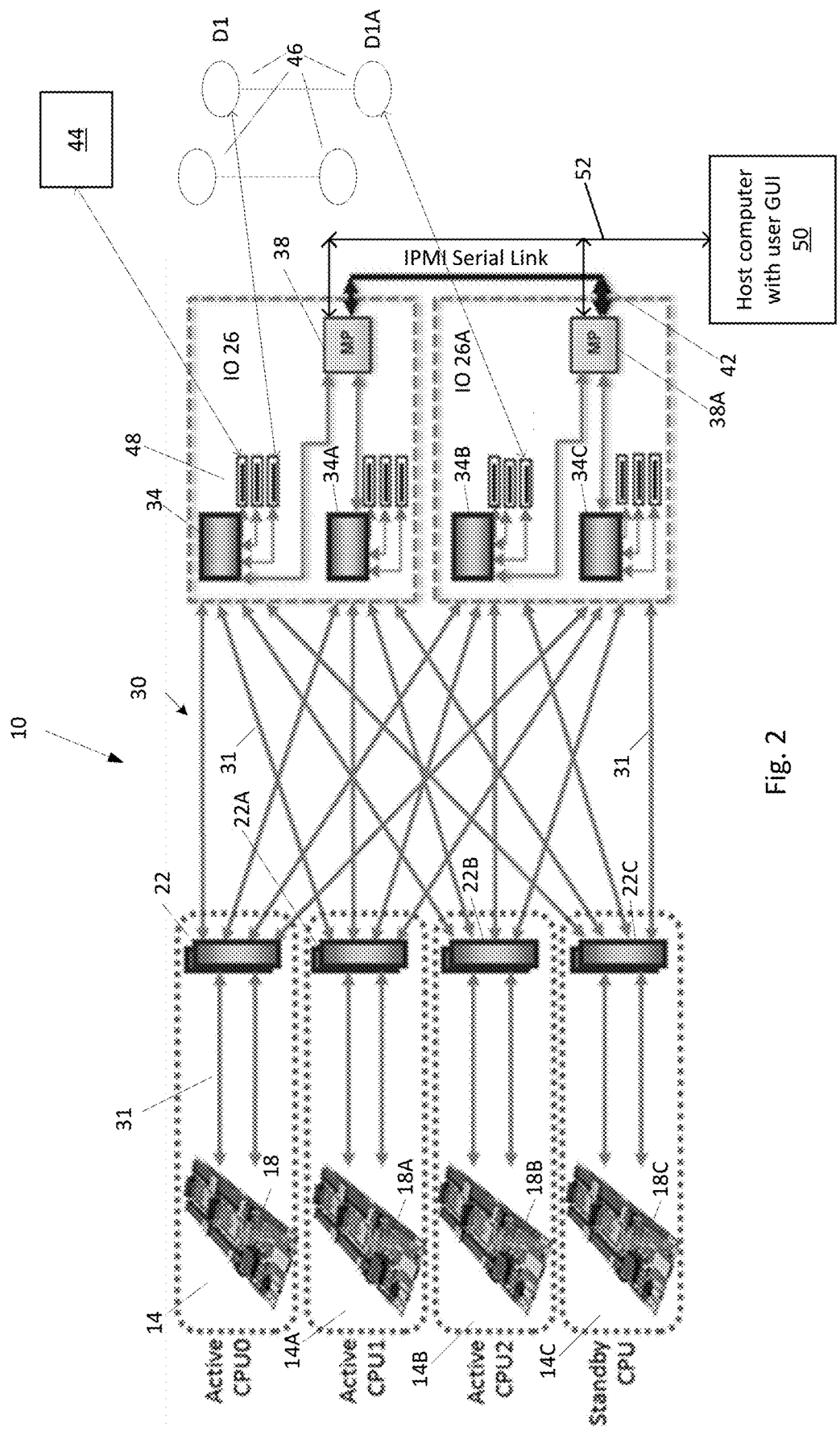
FIG. 2 is a block diagram of the embodiment of the system of FIG. 1 in more detail.

Referring also to FIG. 2, in normal operation, the CPU nodes 14 communicate with the outside world through, in one embodiment, one of two IO domains 26, 26A. The IO domains 26 are connected to the CPU nodes 14 by switching fabric 30 in which each CPU node 14 is connected to each IO domain 26 by various buses, communication channels, interconnects, or links 31. In various embodiments, the buses, communication channels, interconnects, or links 31 can include multiple PCI Express xN interfaces, wherein N is 1, 2, 4, 8, or 16. The IO domains 26 are also redundant. In one embodiment, IO domain 26 is the primary domain that controls communications from the CPU nodes 14 and a second IO domain 26A that acts as a standby domain in case IO domain 26 fails. Each IO domain 26, 26A is also connected to the outside world through network interfaces generally 44, storage controllers and disks generally 46 and additional IO devices.

Each IO domain 26, 26A may be connected to one or more storage disk 46. These storage disks are redundant and have duplicated or mirrored copies of the same data as indicated by the dotted line. Writes to the IO domain are sent to each internal disk in both IO domains 26 and written to the mirrored pair of disks D1 and D1A. Read requests for data are serviced from the primary domain 26 as long as it is functioning properly. In case of a failure of the primary domain 26, read requests are serviced from the disk of the secondary or standby IO domain 26A.

The system is now generally discussed in terms of its hardware architecture and its operation when hardware failure occurs.

Hardware Implementation

In more detail, and referring again to FIG. 2, the system 10 constructed according to one embodiment of the disclosure includes a number of CPU nodes 14, 14A, 14B, 14C (generally 14) each including a hardware CPU Unit 18, 18A, 18B, 18C (generally 18) and a communications interface 22, 22A, 22B, 22C (generally 22). The system 10 also includes at least two IO domains 26, 26A which are each connected to each of the communications interfaces 22 through a Non-Transparent Bridge (NTB) PCI Express (PCIe) switching fabric 30. In various embodiments, the switching fabric is implemented with variable number of channels. In these embodiments, various hardware configurations can be used to modify the bandwidth of those channels depending on a specific implementations or requirements of the system.

For example, in one embodiment, a CPU Unit can connect to the IO domains using switches (34, 34A, 34B, 34C) which support the Gen3 PCI Express protocol. In other embodiments, the switches (34, 34A, 34B, 34C) may support newer versions of the PCI Express protocol, such as Gen4 or Gen5. Each CPU hardware node 18 includes an operating system (OS); either a single system context OS or a virtual OS including a hypervisor and multiple virtual machines. In general, the various systems and methods disclosed herein can be used with various application specific integrated circuits, communication channels, buses, etc. that facilitate the use of PCIe (and other similar architectures) as a fabric for data centers, cloud computing and other applications.

In use, in the embodiment of a system 10 of N CPU nodes 14 depicted, N−1 CPU nodes 14 are active nodes with a running operating system and application programs and the Nth CPU node 14 is held in standby mode, typically executing a minimal Unified Extensible Firmware Interface (UEFI) firmware program. Again for a redundant system to function, at least one node must be held in reserve in case an active node fails, but the system may include multiple standby nodes. In one embodiment, the minimal UEFI includes a diagnostic program that provides information about the status of the hardware in the Nth or standby CPU node $14_N$. The status of the standby CPU node 14 is available to all of the active CPU nodes 14. When an active CPU node begins to fail and needs to failover to have its computations transferred to a non-failing CPU node 14, the failing CPU node 14 will reserve the standby CPU node 14 and begin the failover process with the cooperation of the Management Processors (MP) 38 and 38A as discussed below.

In one embodiment (the one that is used here as exemplary of the system operation), although the N CPU nodes 14 are connected to the at least two IO domains 26, only one of the IO domains ($IO_0$) functionally communicates with the N CPU nodes 14 and provides a communications link with the outside or non-system network. Each IO board includes a number of embedded devices (for example the network and storage controllers) and PCI Express slots, which may be populated with controllers of the user's choice. Each IO domain 26 includes two switching fabric control components 34, 34A, 34B, 34C (generally 34). Each switching fabric component 34 is configurable by firmware or by software through a set of API functions for internal switch management In one embodiment, this switching fabric control component 34 is a fabric-mode PCI Express switch with a switching integrated circuit that, in conjunction with an on-board management processor (MP) 38, 38A (generally 38), controls the connection of the CPU nodes 14 to the IO domains 26 in the switching fabric 30 through an instantiation of software termed the Management Engine (ME).

Each ME communicates directly with the fabric control components 34 on the board of the ME's respective MP 38. The MP 38 of the domain 26 communicates with the MP 38A of other IO domain 26A through an Intelligent Platform Management Interface (IPMI) serial communications link 42. Each ME instance queries the fabric control switching components 34 to which it's connected, by way of the switching component's firmware API, for the list of physical and virtual functions within the switching component's hierarchy. "Virtual functions" are functions defined under the PCI Express specification so that one physical device can be shared among multiple guest virtual machines (VMs) without the overhead of making addition requests to the Hypervisor or host operating system that controls the functioning of the individual VMs and their communication with the outside world. In addition, the ME also provides an API (ME-API) for viewing, configuring and allocating the IO devices 44, 46 and functions in its IO domain 26, 26A. These I/O devices and functions are then allocated to the switching components 34, 34A and CPU 18 groups which are assigned to each switching component, again by way of the firmware API. This in turn creates N synthetic sub-hierarchies which can each be assigned to a host port. That is, the I/O devices 44, 46 are assigned to switching fabric components 34, 34 and the components 34, 34A are then assigned to specific ports of CPU nodes 14, 14A etc.

The allocations of nodes and devices are provided by the user to the MEs by way of a Management Service (MS) application that optionally includes a user GUI executing on a host computer 50 and communicating with each ME by way of a network 52. The MS provides a set of function calls to ME kernel drivers. A Provisioning Service (PS) executing on each ME receives lists of CPU, memory, VM and IO resource requirements for each CPU node established by the user through the ME-API calls from the host computer 50.

The IO domains 26 and 26A are thereby configured such that each CPU node 14 has exclusive access in the IO domains 26 and 26A to a subset of the IO endpoint devices such as disks 46. The endpoint devices may provide physical or virtual functions within the IO domains 26. In other embodiments, the second IO domain 26A is also active and some number of active and/or standby CPU nodes are connected to and communicate through it.

In operation, each CPU node 14 except one is active, executing the code of its operating system and associated application programs. The operating system (Windows® (Microsoft Corporation, Redmond, Wash.), ESXi™ (VMWare Inc., Palo Alto, Calif.), Linux® (Linus Torvalds, Dunthorpe, Oreg.), etc.) of each active CPU node 14 may be the same or different from the other active CPU nodes. Each active CPU node 14 communicates through one active IO domain ($IO_0$) 26 while the other IO domain ($IO_1$) 26A is available as the secondary IO domain. In some cases, the secondary IO domain maintains a mirrored copy of data, as is done in RAID 1 configuration for disks. In other cases, the secondary domain may provide load balancing or hot standby services for multiple network ports being treated as a single network port (termed a "network bond" in Linux or "team" in Windows).

Once the configuration of I/O domains and CPU nodes is established, and one or more active CPU nodes are running instances of an operating system if a CPU node 26 begins to fail, for example CPU node $14_2$, the operating system and the application programs of that node are transferred to the standby CPU node $14_N$ and the active IO domain ($IO_0$) sets the switching fabric 30 to receive data from the CPU node $14_N$ that was previously the standby node but is now active CPU node $14_N$. The previously active CPU node $14_2$ that was diagnosed as failing undergoes further diagnostics to determine if it needs to be replaced. If CPU node $14_2$ now passes the diagnostics, the error is assumed to be either software-caused or transient, and the CPU node $14_2$ becomes the new standby node.

The result is similar if none of the CPU nodes 14 is failing but the active IO domain (for example, 26) is determined to be failing or about to fail. In this case, the connection information about the active CPU nodes 14 through the switching fabric 30 is passed by the MP 38 of IO domain (for example, 26) to MP 38A of IO domain 26A and IO domain 26A becomes the new active IO domain. The previously active IO domain 26 may then undergo further diagnostics or be removed and replaced. IO domain 26 then becomes the new standby IO domain. The instructions and other data are passed between MP 38 and MP 38A through an Intelligent Platform Management Interface serial communications link 42. It should be noted that if both IO domains 26, 26A are active, if one of the IO domains (for example 26) is failing, the other IO domain 26A reconfigures the fabric switch 30 to accept all communications through the non-failing IO domain 26A.

In one embodiment, using a Windows operating system and zero-copy direct memory access (DMA), the switching fabric 30 can transfer the processor state and memory contents from one CPU node 14 to another at about 56 GB/sec. The fact that the CPU nodes 14 and the IO domains 26 are separate components has the added advantage of reducing the number of single points of failure and adding the ability to replace the failing component without affecting the corresponding non-failing component; e.g., IO domain 26 but not CPU node 14. The redundant IO domains 26 and CPU nodes 14 permit failing components to be dynamically replaced or even added without seriously affecting the applications executing on the CPU node 14 and/or IO domain 26.

Figure 3:
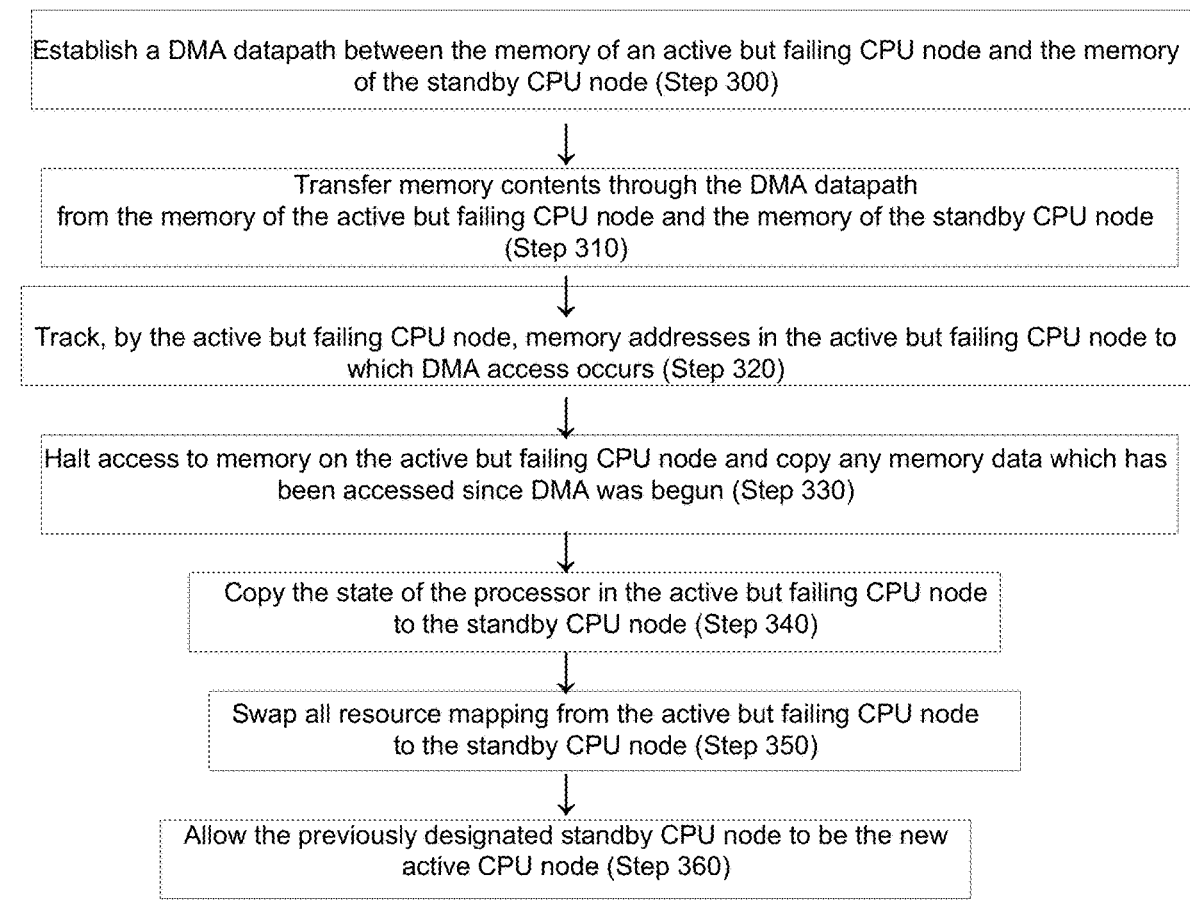
FIG. 3 is a flow diagram of an embodiment of the steps of failover of a CPU according to the disclosure.

Referring also to FIG. 3, the operation of the system will now be considered in more detail.

System Initialization

The process of powering on the multi-node platform and provisioning IO resources can be performed for both physical IO devices and their PCIe functions, as well as for virtual functions for devices which support the functions of the Single Root-I/O Virtualization and Sharing (SR-IOV) portions of the PCI Express specification. The initialization process is orchestrated by the hardware and software in each IO domain. During the initialization process only the IO domains are released from reset while all the CPU nodes remain in the reset state.

Each switching component 34 completes its reset and initialization processing and executes its internal switch management firmware which enumerates its device hierarchy. The hierarchy is generally defined by the full set of all switching component's primary bus reference number (the way the switching component is accessed), a secondary bus (the bus reference number for the other side of the bridge), and a subordinate bus number (the maximum bus number which exists anywhere below the bridge, along with all PCIe devices and functions below the switches and bridges. In one embodiment, the bridge refers to a bus address or bus number for the fabric controller. The systems and methods can be implemented with various hierarchies that may include bridges/switches below other bridges/switches.

Simultaneously, each management processor 38 completes its reset and initialization and subsequently loads and executes an ME instance. Each ME instance queries the switching components 34, 34A to which it's connected, by way of the switching component firmware API, for the completely enumerated hierarchy. Each ME instance then merges the hierarchies from its connected switch components 34, 34A into a single list of physical and virtual functions within its IO domain.

Once the IO domain function lists are established, the ME instances communicate with each other to merge the domain-specific hierarchy lists into a unified list for the entire system and to establish one IO domain and the associated ME as the "primary IO" for the system.

The previous steps allow the user to configure the system to his or her needs. However, for users that do not wish to make use of this ability, a default configuration of replicated resources is allocated to each active compute node 14 (active CPU), but the user can modify the allocation via a provisioning service, if desired. The standby CPU node 14C (standby host) is given only a minimal set of IO devices to run diagnostics and report its status to the other nodes. Additionally, if desired, the user can also override the allocation of IO resources to the various compute nodes. The new allocation data is then stored for the next cold boot.

Once the provisioning of resources has been established for each CPU node 14, each ME instance deploys the desired resources to each switching component 34 for each associated CPU node port. The provisioning data is stored in FLASH or other non-volatile repository accessible to ME 38, 38A for use the next time the entire platform or the IO domains 26, 26A are reset or powered off and then on. In addition, each ME instance enables Downstream Port Containment (DPC) triggers in the switching components 34 to which it's connected, via the switching component firmware API, for each downstream port so as to detect and handle events that include but are not limited to "Link Down" errors, Uncorrectable and Fatal errors, and other software triggers. When any one IO device encounters an error, the switching component hardware 34 isolates that downstream link and the firmware synthesizes responses/completions for any pending transactions to devices under that link. The firmware also signals an event to the ME which in turn generate a platform interrupt to the affected hosts to inform them that an IO device has become inaccessible.

Once the host-specific device hierarchies are established, each compute node 14 may be released from reset. The boot process for a given CPU 18 in a multi-node platform is the same as it would be for any standard server with standard BIOS and standard OS. Specifically, the BIOS on each CPU node uses a power-on self test (POST process) to determine system health and to enumerate the IO hierarchy which has been exposed to that CPU node by the ME firmware. In one embodiment, the ME firmware runs first, and allocates the available IO resources among the CPU nodes which will be the active hosts. Once each host starts running its own BIOS, each such host is unaware of the presence of an ME. Accordingly, each node boots in the normal way. Once the OS boots and the applicable software components are loaded, such software can interact with the ME firmware again. Notwithstanding this point, from the reference frame of the BIOS and Base OS, neither is aware of or interacts with the ME. The OS bootloader loads the OS image into memory and begins OS execution. The system then boots normally with all IO domains 26 present and visible to the OS. The OS then loads hardened drivers for each instance of each IO device.

Network controller functions are bonded/teamed, using standard OS features. Similarly external storage controllers are duplex when both instances of the controller are healthy and have connectivity to the external storage array. Internal storage controllers need further consideration. When all IO domain devices, other than legacy IO, are duplex, then the entire IO domain is duplex/safe-to-pull.

With the system fully operational, its operation under failure is next considered.

CPU/Memory Failover

The following steps are performed by one embodiment of the disclosure to avoid system failure when there is a CPU node (CPU processor 18 and/or memory) failure occurring or predicted. The applications executing on that failing CPU node will then be transferred to the Standby CPU node 14C.

In overview, the active CPU node 14 which is experiencing either a large number of correctable errors above a predetermined threshold or other degraded capability indicates to the MP 38, associated with the node's IO domain 26, that the node 14 has reached this degraded state, and a failover to the non-failing standby CPU node 14C should commence. The active CPU node 14, MP 38 and the Standby CPU node 14C then engage in a communication protocol to manage the failover process and the transfer of state from the active CPU node 14 to the Standby CPU node 14C. The Standby CPU node 14C, which is the target location for the failover operation, is removed from its diagnostic UEFI loop and signals that it is ready to begin the process of receiving memory contents and state information from the failing active CPU node 14. The active but failing CPU node 14 polls the Standby CPU node 14C for the status of the Standby CPU node's start-up routines. The Standby CPU node 14C enables an NTB window into its PCI-Memory Mapped IO space and begins polling for commands from the active but failing CPU node 14.

Referring to FIG. 3, and at a high level, once the status from Standby CPU node 14C is reported to the active but failing CPU node 14A, the active but failing CPU node 14 enables a datapath (Step 300) to permit a DMA memory copy from the memory of the active but failing CPU node 14 to the memory of the Standby node 14C. The Standby CPU node 14C at this point cannot access any IO domain 26, nor can it initiate read or write access to the memory of the active but failing CPU node 14.

The active but failing CPU node 14 signals to all its drivers which are capable of tracking changes to memory to begin tracking addresses to which DMA traffic is active (both DMA write buffers and DMA control structures).

All memory is copied (Step 310) from the active but failing CPU node 14 to the memory of the Standby CPU node 14C, while DMA traffic continues and while the processors continue executing instructions. The register state of each device that is physically located within the failing CPU node 14 is copied to the Standby node 14C. This period of time during which memory is copied while DMA traffic is still occurring constitutes Brownout time.

The active but failing CPU node tracks pages (Step 320) which are modified by CPU access in addition to the drivers tracking pages which are potentially modified by DMA traffic. During Brownout time, the modified pages can be re-copied while the drivers and host software continue to track newly-modified pages. This process is fully described in U.S. patent application Ser. No. 15/646,769, filed Jul. 11, 2017, the contents of which are hereby incorporated by reference in their entirety.

Figure 4:
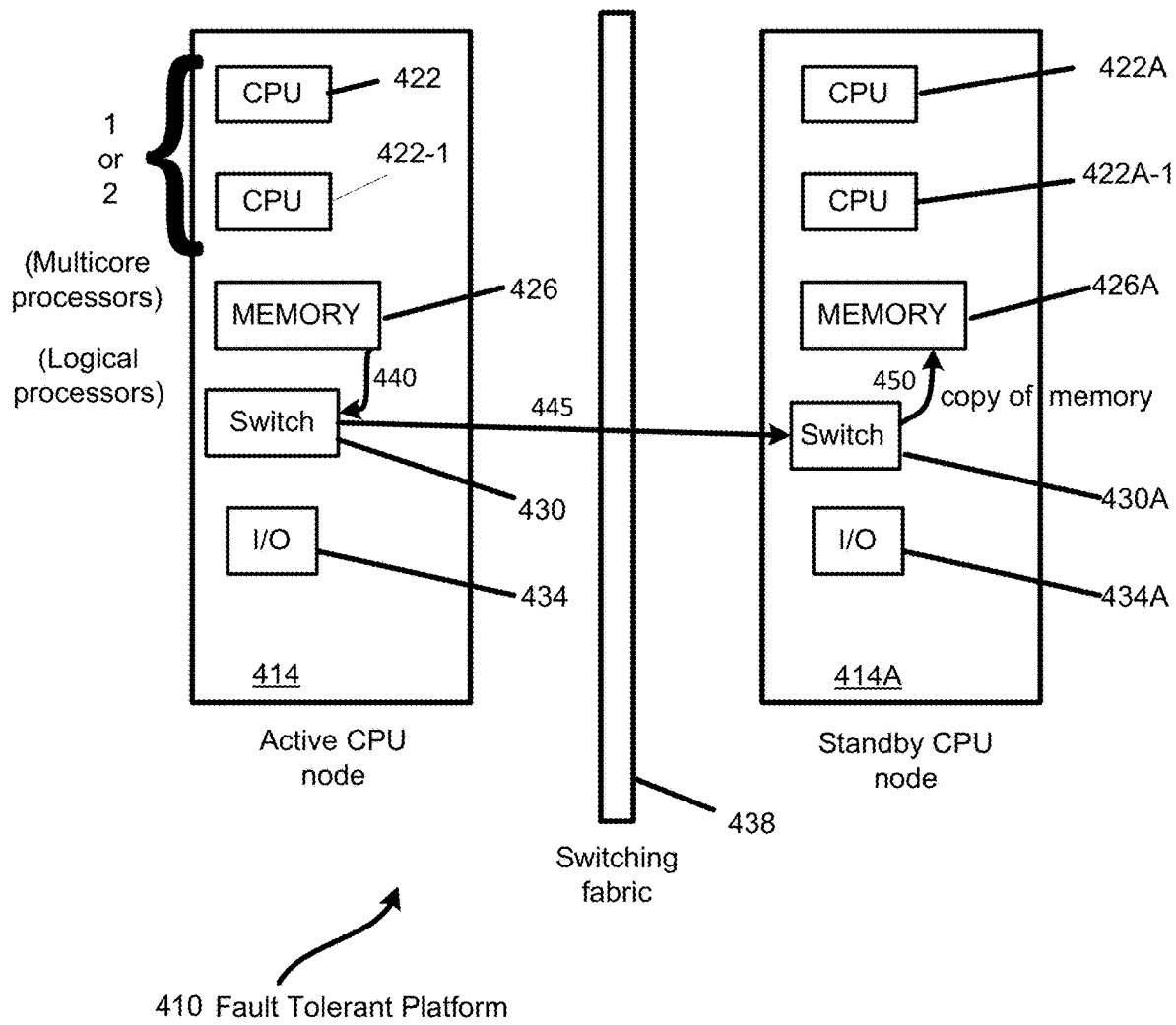
FIG. 4 is a diagram of an embodiment of a fault tolerant system with an active and a standby computer of FIG. 1.

To understand how the blackout phase of the process operates, it is necessary to consider the operation of the fault tolerant system in more detail. Referring now to FIG. 4, the fault tolerant computer system that includes at least two identical computers or nodes 414 and 414A. One computer or node 414 is the currently active or primary processor and receives requests from and provides output data to the client or user. The other computer or node 414A is termed the standby or secondary computer or node.

Each computer or node (generally 414) includes a CPU 422, 422-1, 422A, 422A-1 a memory 426, 426A, a switching 430, 430A, and an input/output (I/O) module 434, 434A. In one embodiment, the two physical processor subsystems 414 and 414A reside on the same switching fabric 438 and communicate with each other through the switching fabric 438. The switching fabric controllers 430, 430A coordinate the transfer of data (arrows 440, 445, 450) from the currently active memory 426 to the standby or mirror memory 426A so that the fault tolerant system can create identical memory contents in both (currently active and standby) subsystems 414, 414A. The I/O modules 434, 434A permit the two subsystems 414 and 414A to communicate with the outside world such as with disk storage 46 (FIG. 2) and the network through a network interface (NI) 44 (FIG. 2).

Although this discussion is in terms of an embodiment with two processor subsystems, more than two processor subsystems can be used in a fault tolerant computer system. In the case of multiple processor subsystems, for example a three-processor (e.g. A, B, C) fault tolerant computer system, the mirroring of the three processor subsystems is performed in two steps. First, processor subsystems A and B are mirrored, and then the resulting mirrored A, B processor subsystems are mirrored to the C processor subsystem, and so on.

During brownout and the subsequent blackout phases, memory that has been modified must be tracked and subsequently copied, when DMA traffic is halted. The problem is that the native operating system of the server may not provide a suitable interface for copying dirty pages from active memory 426 to mirror memory 426A, especially when a virtual machine (VM) system is used. For example, some physical processors such as the Intel Haswell and Broadwell processors (Intel Corporation, Santa Clara, Calif. USA) provide a set of hardware virtualization capabilities including the VMX Root operations that permit multiple virtual operating systems to share the same physical processor simultaneously with full control of many aspects of system execution. The virtual machines each have their own operating system under the control of a host hypervisor. Such systems may not provide an interface to detect and copy dirty pages for memory used by those virtual machines. To understand how the present disclosure works around this limitation, FIGS. 5(A)-5(C) depict, as a layered software diagram, the state of the fault tolerant computer system when undergoing various operations.

Figure 5A:
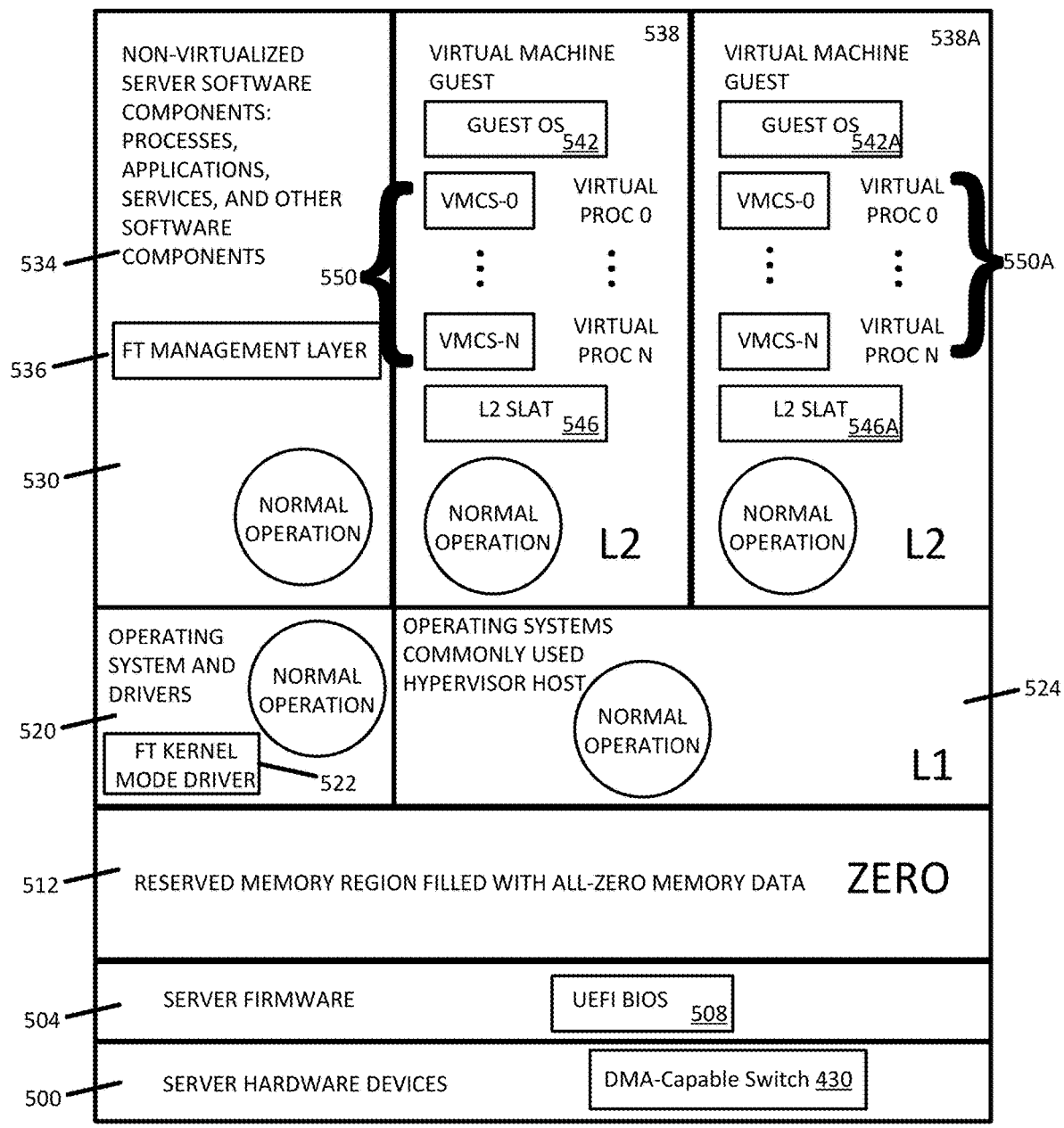
FIGS. 5A-5C are diagrams of an embodiment of the operating software and execution states of the OS, Hypervisor, Guest VM, FT Virtual Machine Manager (FTVMM), and other layers in a fault tolerant computer system during the various stages of memory duplication or mirroring.
Figure 5B:
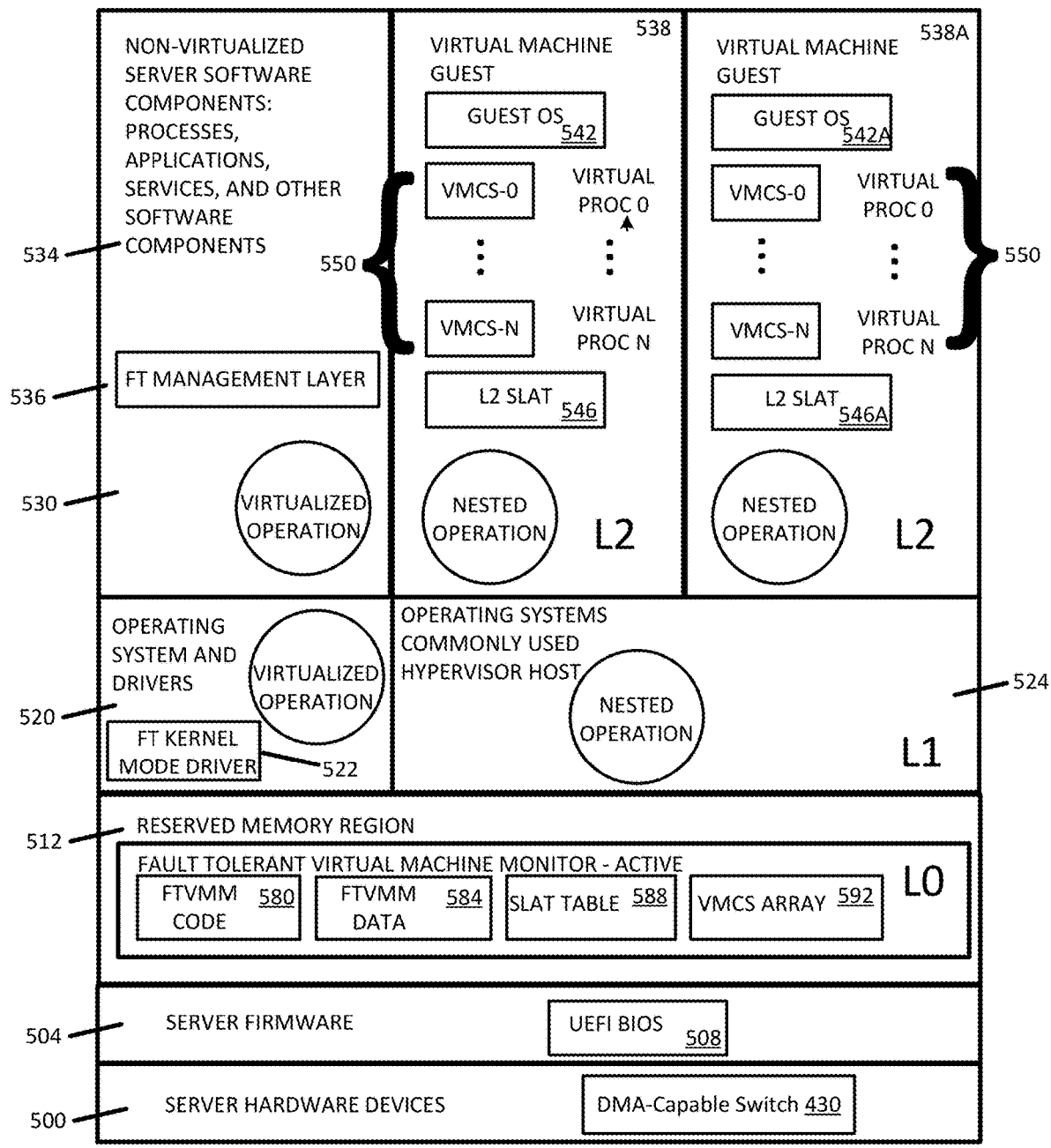
Figure 5C:
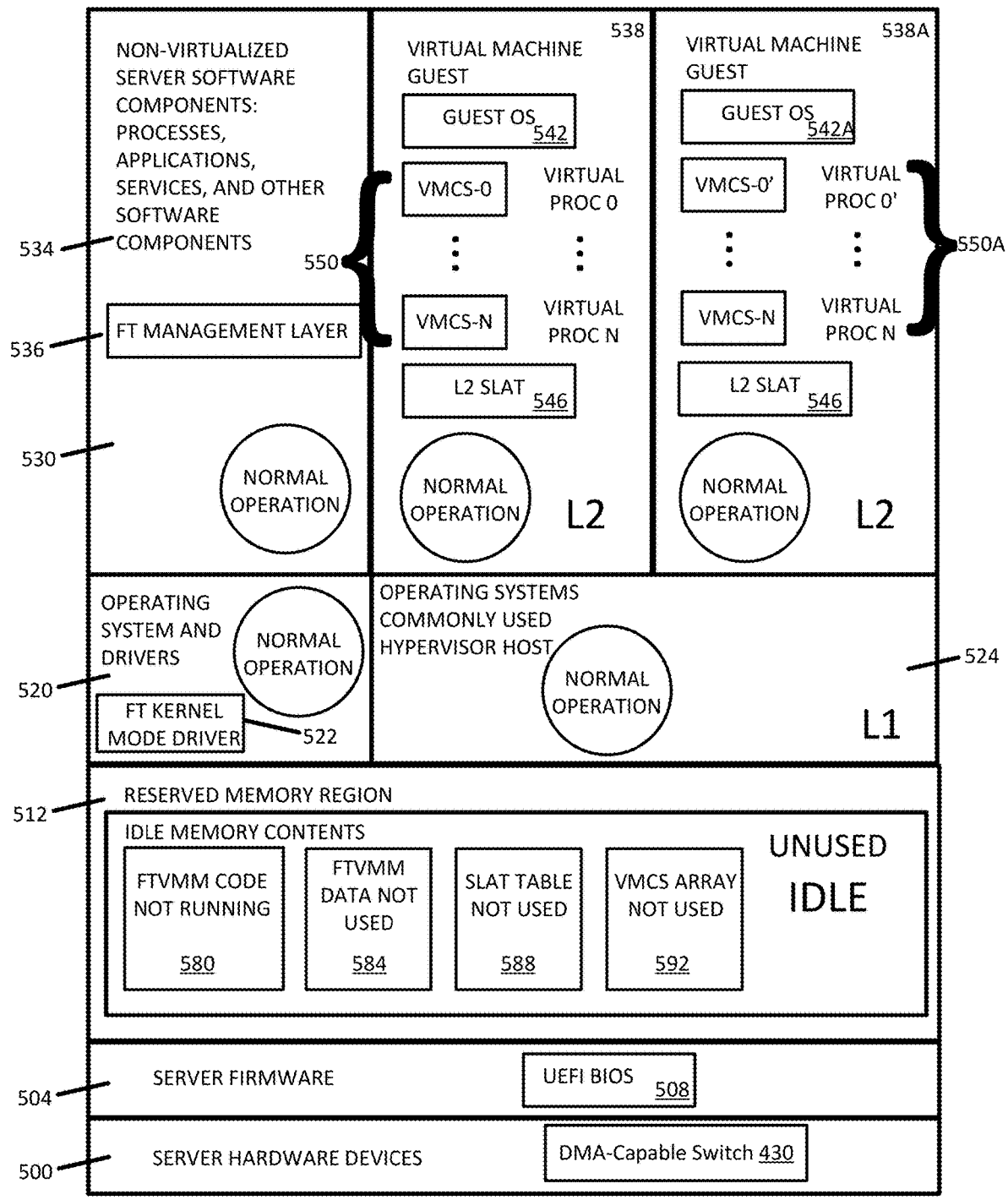

Referring to FIG. 5A, in normal, non-mirrored, operation, the layers in the fault tolerant computer system include a hardware layer 500 including the DMA-Capable Switch 430; a server firmware layer 504 including the system Universal Extensible Firmware Interface (UEFI) BIOS 508; and a zero layer reserved memory region 512 that is initialized to zero. The zero layer reserved memory 512 is reserved by the BIOS 508 at boot time. Although most of the memory of the fault tolerant computer system is available for use by the Operating System and software, the reserved memory 512 is not. The size of the reserved memory region 512 provides sufficient space for the FTVMM and a SLAT table configured with a 4-KB (4-kilobyte) page granularity and with a one-to-one mapping of all system memory. The FTVMM module causes all processors to execute their programs as guests of the FTVMM module. The Second Level Address Translation Table (SLAT) (or as also referred to by various manufacturers: Intel—Extended Page Table [EPT]; AMD—Rapid Virtualization Indexing [RVI]) in the reserved portion of memory that is used to translate memory references to physical memory. In one embodiment, a four-level SLAT Table provides a memory map with dirty bit and accessed bit settings that will identify all memory pages that are modified by the operating system kernel and other software. The four-level SLAT is sufficient to provide sufficient granularity to address each word of memory with a 4-Kbyte granularity, but other page sizes and mappings are possible.

The next layer (L1) 520 includes the operating system and drivers for the fault tolerant computer system, including FT Kernel Mode Drivers 522 and the commonly used hypervisor host 524.

The last layer (L2) 530 includes the non-virtualized server software components which are not controlled by a virtual machine control structure (VMCS) 550 when in normal operation, such as processes, applications, and others 534, and it includes any Virtual Machine Guest (VM) 538, 538A. Non-virtualized software components 534 include an FT Management Layer 536. Each Virtual Machine Guest (VM) includes a VM Guest Operating System (VM OS) 542, 542A, and a SLAT table associated with the VM (SLAT L2) 546, 546A. Also included in each VM 538, 538A is one or more Virtual Machine Control Structures associated with the VM (VMCS-N), generally 550, 550A, one for each of the virtual processors 0-N that are allocated to that VM. In the diagram shown, the virtual processor VMCSs are labeled VMCS 0 to VMCS-N. Each VMCS contains a control field to enable a SLAT Table pointer (such as an Intel Extended Page Table Pointer EPTP) which provides a mapping that translates Guest Physical Addresses to system Physical Addresses.

Referring now to FIG. 5B, at the start of mirroring, the fault tolerant computer system is operating in non-mirrored mode. The FT Management Layer 536 causes the FT Kernel Mode Driver (FT Driver) 522 to begin processing a command to enter Mirrored Execution. The FT Kernel Mode Driver 522 loads or writes the program and data code of the FT Virtual Machine Monitor (FTVMM) code 580, the FTVMM data 584, the SLAT L0 588, and the VMCS-L0 Array 592 into the Reserved Memory Region.

The FT driver initializes the VMCS L0 for each processor and causes the FTVMM to be installed and to execute as a hypervisor whose program code is directly executed by every VMEXIT event (i.e. the processor mechanism that transfers execution from the Guest L2 into the hypervisor that controls the guest) that occurs in the Fault tolerant computer system. The FTVMM processes every VMEXIT and emulates the normal handling of the event that caused the VMEXIT in a manner such that the OS1, OS2, OS Commonly Used Hypervisor L1, and Guest L2 will continue their processing in a functionally normal manner as if the FTVMM were not installed and active.

At this point, the transfer of memory contents takes place under the two conditions, previously discussed: "brownout" and "blackout". Mirroring, in brownout and blackout, may take place within a few minutes after the initial fault tolerant computer system boot, once steady state operation is reached, or whenever a processor subsystem is brought back into service after a hardware error on a running fault tolerant computer system. As discussed above, during the brownout phase, the normal system workload is processed and the processor continues to make computations and to access and modify active memory. Dirty pages caused by memory writes during brownout (while copying memory to the standby computer) are tracked and are copied in the next brownout or blackout phase. The FTVMM provides a Dirty Page Bit Map to identify the modified memory pages in each phase. In Brownout phase 0, all memory is copied while tracking newly dirtied pages. In Brownout phases 1 and later, only the dirtied pages during the previous phase are copied. In Blackout, all processors but one are paused, and interrupts are disabled. No system workload is processed during Blackout. The dirtied pages from the previous (brownout) phase are copied, and a final Modified Page Range List is created. The remaining dirty pages and the active processor state are then copied to the standby computer memory. Once this is complete, the FT Driver generates a System Management Interrupt, and all processors execute in Firmware UEFI BIOS and Firmware SMM Module which generate an SMI, request the MPs 38 and 38A to change the host ports on switches 34, 34A, 34B and 34C to the standby CPU 14C, after which operation resumes on CPU 14C which is now the new Online CPU, and no longer a Standby CPU. The Firmware SMM performs a Resume to the FT Driver, and FT Driver completes the Blackout phase, unloads the FTVMM, releases the processors that were paused, enables interrupts, and completes its handling of the request for CPU failover.

Referring now to FIG. 5C, with the mirroring process completed, the FTVMM code 580 in the reserved memory 512 is unloaded and no longer executing. The FTVMM data 584, the SLAT 588, and the VMCS 192 are not used, and the reserved memory is idle, waiting for the next error condition.

In more detail, during the first phase of Brownout the FT Kernel Mode Driver uses the VMCALL Functional Interface with the FTVMM to issue a command Memory Page Tracking Enable, to request the FTVMM to begin tracking all pages of modified memory in the system. The VMCALL processor instruction in the FT Driver's Functional Interface to the FTVMM causes each logical processor to enter the FTVMM and process the request issued by the FT Driver. The FTVMM performs a function on all processors to begin using its program code in the FTVMM hypervisor context in a manner which obtains a record of all system memory pages which have been newly modified (Dirty Pages). The FTVMM searches the SLAT L0 and all SLAT L2 tables, and sets the Dirty Bits in these tables to zero, and then invalidates the cached SLAT table mappings on each processor. When all processors have completed this function in the FTVMM, the FTVMM returns control to the FT Driver by performing a VMRESUME instruction. The FT Driver then copies all of system memory into the Second Subsystem. The FT Driver may use a DMA controller or the Switch 430 to perform a high speed memory transfer operation that copies all system memory into the secondary or standby computer. The fault tolerant computer system continues to perform its configured workload during this processing.

Brownout Memory Copy Phase 1

As part of brownout memory copy phase 1, the FT driver obtains a dirty page bitmap and copies the newly dirtied pages of memory to the second subsystem. The FT Kernel Mode Driver uses a Functional Interface to issue a command termed Memory Page Tracking Enable on each processor. The VMCALL processor instruction in the FT Driver's Functional Interface to the FTVMM causes each logical processor to enter the FTVMM and process the request issued by the FT Driver. The FTVMM performs a function on all processors to begin using its program code in the FTVMM hypervisor context in a manner which obtains a record of all system memory pages which have been newly modified (Dirty Pages). Then the FTVMM code on each processor searches every 8-byte Page Table Entry in the FT SLAT L0 table and in each guest's SLAT L2 table, and compares the Dirty Bit in each entry with the TRUE value of that bit. When the comparison result is TRUE, the FTVMM sets a bit field in a Dirty Page Bit Map, at a bit field address which represents the address of the dirty or modified page in physical memory, and then clears the Dirty Bit in the Page Table Entry. The memory mapping that is configured in the SLAT L0 has a page size of 4-Kbytes, so one bit in the Dirty Page Bit Map is set for each dirtied page found.

The memory mapping that the Hypervisor L1 configured in the SLAT L2 tables may be larger than 4-Kbytes, and the FTVMM sets a consecutive series of bit fields in the Dirty Page Bit Map, such as 512 consecutive bit field entries for the case of a 2-Megabyte page size, when this occurs. When this process has been completed for the SLAT L0 and SLAT L2 tables, each processor performs a processor instruction to invalidate the processor's cached translations for the SLAT L0 and SLAT L2 tables (such as Intel processor instruction INVEPT), to enable the FTVMM to continue detecting new instances of dirtied pages that may be caused by the system workload.

When all processors have completed this operation in FTVMM, the FTVMM returns control to the FT Driver by performing a VMRESUME instruction. The FT Driver then issues another VMCALL Functional Interface command termed Request Dirty Page Bit Map. The FTVMM then provides a Dirty Page Bit Map containing a record of the recently modified pages, and stores this data in a memory buffer located in a data area of the FT Driver. The FT Driver then copies the set of physical memory pages that are identified in the Dirty Page Bit Map into the corresponding physical memory addresses in the secondary or standby computer. The FT Driver may use a DMA controller or the Switch 430 to perform a high speed memory transfer operation that copies the set of Dirtied Pages into the Second Subsystem.

Brownout Memory Copy Phase 2-N/Repetition

The procedure MEMORY COPY PHASE 1 may be repeated one or more times in order to obtain a smaller resulting set of Dirtied Pages that may be generated by the system workload during the final Brownout Memory Copy Phase N. For example, in one embodiment the FT driver may repeat the same sequence to obtain another dirty page bitmap and copy the newly dirties pages to the second subsystem one or more times.

After the Brownout copy phase is complete, the active but failing CPU 14 signals its drivers, which are tracking DMA memory access, to pause all DMA traffic. (Step 330) This is the beginning of the Blackout phase. CPU threads are then all paused to prevent further modification of memory pages. At this time, the final list of pages modified by either CPU access or DMA access is copied to the Standby CPU 14C.

In more detail during blackout, the FT driver executes driver code on all processors on the active but failing CPU 14 concurrently and copies the final set of dirtied pages to the Standby CPU 14C. The FT Driver causes all processors on CPU 14 to disable system interrupt processing on each processor so as to prevent other programs in the Fault tolerant computer system from generating more Dirty Page Bits. The FT Driver uses the VMCALL Functional Interface to issue a command, Blackout Page Tracking Enable, which causes the FTVMM to identify the set of recently dirtied memory pages and also causes the FTVMM to identify certain volatile or frequently modified memory pages such as the VMCS-N and SLAT L2, and include those pages in the set of dirtied pages. The FTVMM may temporarily pause all processors except processor #0 in the FTVMM. The FT Driver then issues another VMCALL Functional Interface command, Request Dirty Page Bit Map, to obtain the bit map of dirty pages. The FTVMM then provides a Dirty Page Bit Map containing a record of the recently modified pages, and stores this data in a memory buffer located in a data area of the FT Driver.

In one embodiment, the FT Driver then copies the set of physical memory pages that are identified in the Dirty Page Bit Map into the corresponding physical memory addresses in the Second Subsystem. The FT Driver then creates a list of memory ranges that are assumed to be dirty or modified, including a memory range for the Reserved Memory Region, and stores this information in a data structure termed the Final Blackout Memory Range List. This procedure is termed BLACKOUT MEMORY COPY because the system workload does not execute, and the workload experiences a short server processing outage while the final set of Dirtied Pages is being copied into the Standby CPU 14C.

Once all the memory of the active but failing CPU node 14 has been copied, the active but failing CPU node 14 saves the internal state of its processors (Step 340) (including its registers, local Advanced Programmable Interrupt Controller, High Precision Event Timer, etc.) to a memory location, copies that data to the Standby CPU node, where it is subsequently restored into the corresponding registers of the Standby CPU node 14C. A Server Management Interrupt (SMI) return stack is created on the Standby CPU node 14 for the final set of registers (program counters, etc.) which need to be restored on the Standby CPU node 14C to resume processing from the exact point where the active but failing CPU node left off.

The active but failing CPU node 14 sets flags in its own NTB window into the PCI-Memory Mapped IO (PCI-MMIO) space and in the NTB window of the Standby CPU node 14C so that each CPU node 14, 14C has its own intended new state after the failover operation. At any time prior to the completion of this step, the failover can be aborted, and operation simply continues on the original active but still failing CPU node.

To complete the failover, once all steps up to this point have been completed successfully, the active but failing CPU sends a command to the Primary Management Processor (which will coordinate with the Secondary Management Processors and handle any error cases in this step) to swap all of the resource mapping (Step 350) between the host ports for the two CPU nodes 14, 14A which are participating in the failover operation. Each management processor will then make a series of firmware API calls to its local switch to accomplish the resource mapping changes. The Primary Management Processor then signals to the two CPU nodes when the switch reconfiguration is complete.

Both CPU nodes 14, 14C read the token from their mailbox mechanism showing their new respective states (swapped from the original active and standby designations). Software on the new Active CPU node then performs any final cleanup as required. For example, it may be necessary to replay PCI enumeration cycles in order to train the switching fabric to map transactions from the new Active CPU node (Step 360) and perform a Resume from System Management (RSM) instruction to return control to the operating system and resume the interrupted instruction. The Standby CPU node can reactivate the previously quiesced devices and allow transactions to flow through the fabric to and from the Standby CPU node.

In addition to the CPU/memory failover capability just discussed, the disclosure is also capable of transferring the active IO domain, for example IO$_1$, to the other or Standby IO domain, for example IO$_2$.

IO Domain Failover

In one embodiment, the following steps are performed to provide IO domain failover. In normal operation, when the system 10 boots, all the IO domains 26 are present and visible to the operating system. Drivers are then loaded for each instance of each IO domain. Network controller functions are bonded or teamed between two active IO domains, the primary 26 and the secondary 26A, using standard operating system commands. Any external storage controllers are in the duplex state when both instances have connectivity to the external storage array. When all PCI devices, other than legacy IO, are duplex, then the entire IO bay is duplex/safe-to-pull, meaning that the platform can tolerate loss of the IO bay due to either a fault or a service action without impacting normal operation of the system and thus its availability.

Briefly, in overview, a failure a device such as a disc controller 46 will trigger a Downstream Port Containment (DPC) event within the affected switching component 34. The switching component hardware 34 isolates the link between the switching component 34 and the device and the switching component firmware 34 completes any pending transactions to device. The firmware also signals an event to the ME 38 which in turn generates an interrupt to the affected CPU nodes 14 to inform them that an IO device has failed. The failure could result in a single endpoint device being isolated by the DPC logic if detected by a switching component immediately above the affected device, or the failure could result in the isolation of a larger set of devices in the IO domain, if detected by a switch higher up in the device hierarchy.

In more detail, the MP 38, 38A enables DPC (Downstream Port Containment) Failover Triggers in the fabric-mode switch component (generally 34) for each downstream port connecting a CPU node to a device. Potential Failover Triggers include Link-Down errors, and uncorrectable and fatal errors, in addition to intentional software triggers; for example to shut down and remove an IO domain 26. When the Failover Triggers are enabled, if any IO domain 26 encounters an error, the fabric switching component 34 for that IO domain 26 isolates that communication link with the device and completes any pending transactions to a device utilizing that link. The MP 38, 38A then generates an interrupt to the CPU nodes 14 utilizing the device, informing them that a device or an IO domain 26 has failed.

The CPU node OS receives the platform interrupt and interrogates the MP 38, 38A as to which IO device(s) have failed, or whether the entire IO domain board 26 has failed. The OS of the CPU node will then begin removal of the drivers for the affected device(s). The surviving duplex partner to each affected IO device will be marked as "simplex/primary". The MP 38, 38A (FIG. 2) on the unaffected board will be marked as primary.

The MP 38, 38A then reads the error registers from the failing IO domain 26 and from the switching component 34. The MP 38, 38A next attempts to bring the device back into service by asserting an independent reset to that domain, followed by some diagnostics. If the diagnostics are successful, the MP 38, 38A will restart the functions within the device, including any Virtual Functions which had been created and saved in flash memory in IO domains 26, 26A.

MP 38, 38A sends a message announcing that a new hot pluggable IO domain is available to each CPU node. Each CPU node then scans the PCIe hierarchy of devices to discover the newly-arrived devices/functions and load the appropriate drivers.

When all IO devices are once again active in the duplex state, then the entire IO domain is again duplex/safe-to-pull.

Unless specifically stated otherwise as apparent from the following discussion, it is appreciated that throughout the description, discussions utilizing terms such as "processing" or "computing" or "calculating" or "delaying" or "comparing", "generating" or "determining" or "forwarding or "deferring" "committing" or "interrupting" or "handling" or "receiving" or "buffering" or "allocating" or "displaying" or "flagging" or Boolean logic or other set related operations or the like, refer to the action and processes of a computer system, or electronic device, that manipulates and transforms data represented as physical (electronic) quantities within the computer system's or electronic devices' registers and memories into other data similarly represented as physical quantities within electronic memories or registers or other such information storage, transmission or display devices.

The algorithms presented herein are not inherently related to any particular computer or other apparatus. Various general purpose systems may be used with programs in accordance with the teachings herein, or it may prove convenient to construct more specialized apparatus to perform the required method steps. The required structure for a variety of these systems is apparent from the description above. In addition, the present disclosure is not described with reference to any particular programming language, and various embodiments may thus be implemented using a variety of programming languages.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The examples presented herein are intended to illustrate potential and specific implementations of the present disclosure. The examples are intended primarily for purposes of illustration of the disclosure for those skilled in the art. No particular aspect or aspects of the examples are necessarily intended to limit the scope of the present disclosure.

The figures and descriptions of the present disclosure have been simplified to illustrate elements that are relevant for a clear understanding of the present disclosure, while eliminating, for purposes of clarity, other elements. Those of ordinary skill in the art may recognize, however, that these sorts of focused discussions would not facilitate a better understanding of the present disclosure, and therefore, a more detailed description of such elements is not provided herein.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "platform," or "component" may include various computers or computer systems, or may include a reasonable combination of software, firmware, and/or hardware.

In various embodiments of the present disclosure, a single component may be replaced by multiple components, and multiple components may be replaced by a single component, to perform a given function or functions. Except where such substitution would not be operative to practice embodiments of the present disclosure, such substitution is within the scope of the present disclosure. Any of the servers, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present disclosure. Programming languages for computer software and other computer-implemented instructions may be translated into machine language by a compiler or an assembler before execution and/or may be translated directly at run time by an interpreter.

Examples of assembly languages include ARM, MIPS, and x86; examples of high level languages include Ada, BASIC, C, C++, C #, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium.

Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present disclosure based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity.

Unless otherwise indicated, all numbers expressing lengths, widths, depths, or other dimensions and so forth used in the specification and claims are to be understood in all instances as indicating both the exact values as shown and as being modified by the term "about." As used herein, the term "about" refers to a ±10% variation from the nominal value. Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques. Any specific value may vary by 20%.

The invention may be embodied in other specific forms without departing from the spirit or essential characteristics thereof. The foregoing embodiments are therefore to be considered in all respects illustrative rather than limiting on the disclosure described herein. Scope of the invention is thus indicated by the appended claims rather than by the foregoing description, and all changes which come within the meaning and range of equivalency of the claims are intended to be embraced therein.

It will be appreciated by those skilled in the art that various modifications and changes may be made without departing from the scope of the described technology. Such modifications and changes are intended to fall within the scope of the embodiments that are described. It will also be appreciated by those of skill in the art that features included in one embodiment are interchangeable with other embodiments; and that one or more features from a depicted embodiment can be included with other depicted embodiments in any combination. For example, any of the various components described herein and/or depicted in the figures may be combined, interchanged, or excluded from other embodiments.

What is claimed is:

1. A fault tolerant computer system comprising:
    a plurality of CPU nodes, each CPU node comprising a processor and a memory, wherein one of the CPU nodes is designated a standby CPU node and remainder are designated as active CPU nodes, wherein one or more of the active CPU nodes is executing an operating system and one or more customer applications;
    at least two IO domains, wherein at least one of the IO domains is designated an active IO domain performing communication functions for the active CPU nodes; and
    a switching fabric connecting each CPU node to each IO domain,
    wherein if one of: a failure, a beginning of a failure and a predicted failure occurs in an active node, processor state and memory contents of the active CPU node is transferred to the standby CPU node through a DMA datapath, wherein the memory contents and processor state comprise the state of the running operating system and the one or more customer applications such that the operating system and the one or more customer applications are transferred to the standby CPU node, wherein the standby CPU node becomes new active CPU node and continues executing the transferred operating system and the one or more customer applications.

2. The fault tolerant computer system of claim 1, wherein each CPU node and IO domain are configured to be replaced without affecting applications executing on one or more of the other CPU nodes and IO domains.

3. The fault tolerant computer system of claim 1, wherein each IO domain comprises:
    at least two switching fabric control components, each switching fabric control component in communication with the switching fabric.

4. The fault tolerant computer system of claim 1, wherein each IO domain further comprises a set of IO devices, wherein each IO device comprises one or more physical functions and/or virtual functions, wherein one or more physical and/or virtual functions in one IO domain are shareable.

5. The fault tolerant computer system of claim 4, wherein one or more physical functions comprises one or more virtual functions.

6. The fault tolerant computer system of claim 4, wherein the set of IO devices and the one or more physical and/or virtual functions are allocated to one or more CPU nodes and one or more of two switching fabric control components to define one or more sub-hierarchies assignable to ports of the one or more CPU nodes.

7. The fault tolerant computer system of claim 4, wherein one or more of the set of IO devices and the virtual functions are partitioned among a set of physical CPU nodes, the set of physical CPU nodes comprising the active CPU node and the standby CPU node.

8. The fault tolerant computer system of claim 6 further comprising one or more management engine instances which run on a management processor in each IO domain, wherein each management engine queries the switching fabric control components connected to the respective management engine to obtain an enumerated hierarchy of physical and/or virtual functions on a per control component basis, wherein each management engine merges enumerated per-component hierarchies into a per-domain hierarchy of physical and/or virtual functions within the IO domain associated with each management engine.

9. The fault tolerant computer system of claim 7 further comprising one or more provisioning service instances, wherein each provisioning service runs on the management processor in each IO domain, wherein each provisioning service queries per-domain management engine instance for each per-domain hierarchy, wherein each provisioning service per-domain instances communicates with the provisioning service in the other I/O domain to form a unified hierarchy of physical and/or virtual functions in the system.

10. The fault tolerant computer system of claim 9, wherein either of the provisioning service per domain instances is capable of servicing requests from composition interfaces, wherein either of the provisioning service is also capable of verifying viability of one or more system composition requests in terms of guaranteeing redundancy across JO domains.

11. The fault tolerant computer system of claim 1, wherein each JO domain further comprises a management processor and a first switch, wherein each CPU node is in communication with the switching fabric.

12. The fault tolerant computer system of claim 11, wherein the management processor of an active JO domain controls communication through the switching fabric.

13. The fault tolerant computer system of claim 1, wherein each JO domain is in communication to the other JO domain through a serial link.

14. The fault tolerant computer system of claim 1, wherein the switching fabric is a Non-Transparent Bridge (NTB) PCI Express (PCIe) switching fabric.

15. A method of performing CPU node failover in a fault tolerant computer system having a plurality of CPU nodes, each CPU node comprising a processor and a memory, wherein one of the CPU nodes is designated a standby CPU node and the remainder are designated as active CPU nodes, at least two IO domains, wherein at least one of the IO domains is designated an active IO domain performing communication functions for the active CPU nodes, the method comprising the steps of:
    connecting each CPU node to each IO domain using a switching fabric;
    executing an operating system and one or more customer applications on one or more of the plurality of CPU nodes;
    establishing a DMA datapath between the memory of an active but failing CPU node and the memory of the standby CPU node;
    transferring memory contents and processor state through the DMA datapath from the memory of an active but failing CPU node to the memory of the standby CPU node, the memory contents and processor state comprising state of the running operating system and one or more customer applications;

tracking, by the active but failing CPU node, memory addresses in the active but failing CPU node to which DMA access occurs;

halting access to memory on the active but failing CPU node and copying any memory data which has been accessed since DMA was begun;

copying the state of the processor in the active but failing CPU node to the standby CPU node;

swapping all resource mapping from the active but failing CPU node to the standby CPU node;

designating previously designated standby CPU node to be the new active CPU node; and continuing execution of the operating system and the one or more customer applications transferred to the new active CPU node.

16. The method of claim 15 further comprising the step of the active but failing CPU node setting flags in its own NTB window into PCI-Memory Mapped IO space and the NTB window of the standby CPU node so that both CPU nodes has its own intended new state after a failover operation.

17. The method of claim 15 further comprising the step of the active but failing CPU node polling the standby CPU node for status of start-up routines.

18. The fault tolerant computer system of claim 1, wherein the active IO domain sets the switching fabric to receive data from the new active CPU node.

19. The system of claim 1, wherein each CPU node and each IO domain are a modular component, wherein each modular component may be replaced, if failing, without affecting a corresponding non-failing modular component.

20. The fault tolerant computer system of claim 1, wherein the switching fabric comprises a first switch and a second switch, wherein the active IO domain comprises the first switch and a second IO domain comprises the second switch.

* * * * *